Jan. 20, 1970 S. S. TILLETT 3,491,237
OPTICAL STRUCTURES
Filed Aug. 9, 1967
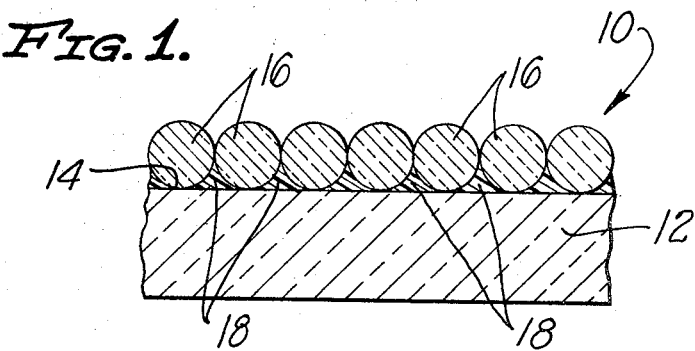
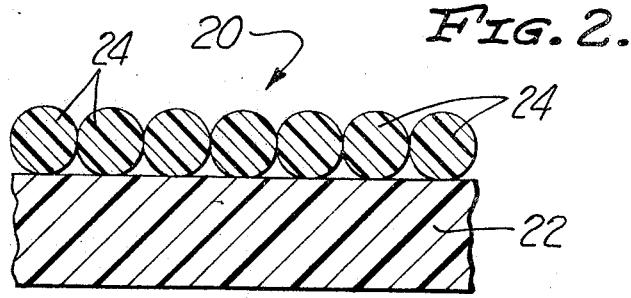
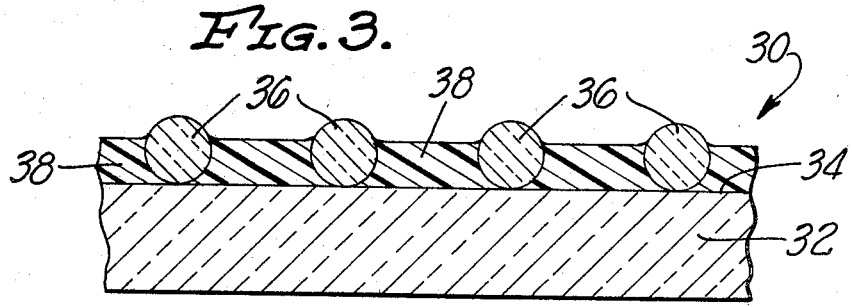
INVENTOR
STEPHEN S. TILLETT
BY
EDWARD D. O'BRIAN
ATTORNEY

United States Patent Office 3,491,237
Patented Jan. 20, 1970

3,491,237
OPTICAL STRUCTURES
Stephen S. Tillett, % Departamento de Biologia, Centro Experimental de Estudios Superiores, Barquisimeto, Lara, Venezuela
Filed Aug. 9, 1967, Ser. No. 659,511
Int. Cl. G01n 21/16, 21/38; H01j 1/62
U.S. Cl. 250—71
6 Claims

ABSTRACT OF THE DISCLOSURE

An optical structure is disclosed which has a layer of discrete, transparent particles located upon a surface of a transparent body. Each of the particles is in direct contact with the surface and is bonded in place. The particles can be of a type capable of transmitting any specific illumination, or of fluorescing in response to a predetermined illumination. The particles may contact one another, or be spaced from one another.

BACKGROUND OF THE INVENTION

The term "optical structure" is used in this specification to designate structures which can be used in connection with illumination for a variety of different purposes. Perhaps the optical structures described in this specification can be considered as being most closely related to prior ground glass structures. Certain of the optical structures of this invention can be used in place of conventional ground glass, although structures falling within the scope of this invention can also be used for other purposes.

A "ground glass" as the term is used herein designates a transparent or translucent body having a roughened or "ground" type of surface. Such ground glasses are frequently made by abrading a surface of a glass plate, etching a surface of a glass plate, or the like. Not infrequently, similar effects are achieved on plastic sheets or body, and occasionally coatings are applied to a transparent sheet or body in order to achieve a "ground glass" type of structure.

Such ground glasses are commonly used in focusing a camera and in other various related applications because of their ability to convert illumination representing at least one image into an easily viewed form. Thus, for example, when a ground glass is used in focusing a camera it is located in the area normally occupied by photographic film, and the camera is focused until the image on the ground glass becomes sharp. At this point the ground glass in a camera is normally replaced by a film and a picture is taken.

With conventional types of ground glasses as are briefly indicated in the preceding a number of problems are encountered. An etched or otherwise roughened surface is apt to pick up and retain dirt, and thus become incapable of presenting a visual image which is as bright, clear and sharp as normally desired. Further, the very nature of such a surface makes a bright, clear, sharp image relatively difficult to achieve. There is a continuing need for improved ground glasses to be used in photographic and other work which will produce as bright, clear and sharp an image as possible.

SUMMARY OF THE INVENTION

An object of the present invention is to provide new and improved optical structures which can be used in place of conventional ground glass in order to meet this need. However, the present invention is broader than this. A further object of this invention is to provide different optical structures which can be used in manners roughly analagous to the manners in which ground glasses are used in order to obtain visual images corresponding to illumination of a particular wave length, or particular wave lengths, and which can be used in a similar manner so as to present a visual image corresponding to radiation such as is normally invisible. A still further object of this invention is to provide optical structures which can be used in the manner of so-called "screens" in photoengraving and related processes.

Still other objects of the invention are to provide optical structures as herein described which are exceedingly simple in structural detail, which are easily made and which are efficient for the foregoing and various other uses. Some of such other uses are indicated in subsequent portions of this specification. It is considered that the optical structures herein described may be used in virtually an indeterminate number of different manners in order to obtain various specialized effects.

An an aid to understanding this invention it can be indicated in essentially summary form that each of the optical structures of the invention comprises a transparent body having a surface which is covered with a layer of discrete, transparent particles. Each of the particles is located directly against the surface. All of the particles are bonded in place so as to provide a complete, stable structure. Preferably each of the particles is a spherical shape. The particles may be directly bonded to the surface as by welding, or may be secured in place through the use of an appropriate material serving as a binder.

DESCRIPTION OF OF THE DRAWING

The actual character of various optical structures of this invention is best explained by reference to the accompanying drawing in which:
FIG. 1 is a partial cross-sectional view of one embodiment of the invention;
FIG. 2 is a partial cross-sectional view of another embodiment of the invention; and
FIG. 3 is a partial cross-sectional view of a further embodiment of the invention.

DESCRIPTION OF THE PREFERRED EMBODIMENTS

In FIG. 1 of the drawing there is illustrated a presently preferred embodiment or form of an optical structure 10 of the present invention which is capable of being used as a ground glass in cameras and other various related applications. This structure 10 includes a flat, planar sheet 12 of transparent, clear glass having a surface 14 which is covered with a layer of transparent, clear glass particles 16. Preferably these particles 16 are spheres, or substantially spherical in form and are all of the same or substantially the same size. Preferably the spheres or particles 16 contact, or substantially all contact one another as shown. These spheres 16 are bonded to the surface 14 by means of an appropriate binder 18. If desired, the sheet 12 and/or the particles 16 may be of an organic polymer composition.

Preferably the spheres 16 are from about ½ micron to about 10 microns in diameter, and all are of substantially the same diameter so that a visual image achieved with the structure 10 will be of a uniform character. If the spheres 16 are smaller than about ½ micron in diameter it bkecomes exceedingly difficult to obtain an image on the structure 10 which may be easily and conveniently viewed with the eye. If, on the other hand, these spheres 16 are larger than about 10 microns in diameter, the image obtained with or on the structure 10 tends to be unnecessarily coarse in character. Presently preferred results are considered to be achieved when the spheres 16 are from about 1 to about 4 microns in diameter.

The complete structure 10 may be easily created by mixing a dispersion or suspension of the spheres 16 in an appropriate liquid binder, and then applying the suspension or dispersion to the surface 14 in such a manner that each of the spheres 16 directly contacts this surface so as to be capable of receiving incident light from it, and then causing the binding material to "set up" so as to create the final structure 10. With the optical structure 10 it is preferred that the binder material be of a clear, transparent character so that it affects the optical properties of the spheres or particles 16 as little as possible.

The amount of the binder will, of course, vary depending upon the size of the spheres used. It is considered that an amount of binder should be employed so as to be just sufficient to firmly bond the spheres 16 in place. This amount can easily be determined by simple, routine experimentation. If an excess is used, there is a tendency for the spheres 16 to be covered to such an extent with the binder as to tend to obscure these spheres. This method of manufacture may be easily follower by creating a disperson or suspension of a conventional uncolored polystyrene latex and the spheres used, applying it to a surface as shown and then drying at a temperature of about 150° F.

If the structure 10 is to be used for special "ground glass" or other effects the individual spheres 16 may be of a mixture of spheres of different colors, or may all be of the same color. If desired these spheres 16 can be formed out of a glass or other material which will only transmit illumination of a specific frequency or within a specific range of frequencies. Such glasses and materials are well known. This may be desirable, as for example, when the structure 10 is to be used for various types of photography of a specialized nature. Similarly, the spheres 16 may be of the type of known glass or other material which will fluoresce in response to normally non-visible radiation such as ultraviolet radiation or infra red radiation so as to enable the production of a visible image by fluorescence.

In FIG. 2 of the drawing there is shown another optical structure 230 of the present invention which uses a planar sheet 22 of any clear, transparent thermoplastic material which is coated with a layer of discrete clear, transparent thermoplastic particles 24, each of which is directly bonded to the sheet 22. Preferably all of the particles 24, or substantially all of the particles touch one another. Preferably these particles 24 are all spherical or substantially spherical. Also, preferably they are of the same sizes as discussed in connection with the particles 16. These particles 24 may be clear, may all be in the same color or may be a mixture of various colors, and/or may contain one or more known dyes causing them to fluoresce in response to various types of illumination, including both visible and normally invisible illumination.

This structure 20 may be easily created by applying the particles 24 of a material such as polystyrene to the sheet 22 of a material such as polystyrene and then adhering them by the application of a sonic energy, moderate amounts of heat, or the like. Such methods will, of course, tend to cause the individual particles 24 to bond together and to the sheet 22 as shown. It may also tend to cause a slight deformation of these particles 24 and of the surface 20 upon which they are located.

In FIG. 3 of the drawing there is shown another optical structure 30 of the present invention including a flat, planar sheet 32 of a clear, transparent glass having a surface 34 corresponding to the surface 14 previously described covered with a layer of clear, transparent glass particles 36 corresponding to the particles 16 previously described. With the structure 30 these particles 36 are spaced from one another whereas the particles 16 are located as close to one another as reasonably possible. The particles 36 are held in this manner by means of an opaque binder 38 which covers the surface 34 and which bridges the spaces between the particles 36. It will be noted that these particles 36 are, however, in direct contact with the surface 34 so as to be capable of receiving illumination through this surface.

Within the optical structure 30 the individual particles 36 may also be spherical or substantially spherical in form. They may be clear, they may be colored in any random or uniform manner, and they may contain one or more known materials causing them to fluoresce in response to various types of illumination such as visible and normally invisible illumination. Further, for specialized effects, these particles 36 may be of different diameters. It is presently considered that they should be of the same diameters as the various particles 16 previously described.

This structure 30 may be easily created by applying to the surface 34 a thin layer of a conventional opaque binder in a liquid form or of a known adhesive type of material, then applying to and pressing within this material the particles 36 to a sufficient extent that they are in direct contact with the surface 34, and causing the binder to "set up." Other methods of manufacture can also be employed. With this embodiment of the invention the particles 36 and/or the sheet 32 may be of an inorganic or organic polymer composition.

Although the structure 30 may be capable of being used as a ground glass it is considered that this structure is of primary utility when used substantially as a photoengraving screen in reproducing continuous tone photographs for reproduction purposes by any type of printing process. With this screen the particles 36 are located in essentially a random manner so as to each be capable of operating as an individual opening within a conventional photoengraving screen. The fineness of the effects obtained by this use in reproducing a picture will, of course, vary depending upon the size and spacing of the particles 36, as well as the nature of these particles. It is considered possible to obtain some distinctly unique reproduction effects with this embodiment or form of the invention, particularly when the particles 36 are of different or random colors or fluorescence in various manners.

From the aforegoing those skilled in the art of optical structures will realize the structures herein set forth may be easily and conveniently created in different manners. They will further realize that these structures may be used in a number of different ways so as to obtain specialized effects. As an example of this they may be used as screens for intercepting and viewing images in much the manner in which a ground glass may be used. Because of the nature of this invention it is to be considered as being limited solely for the appended claims forming a part of this disclosure.

What is claimed is:
1. An optical structure which comprises:
 a transparent body having two surfaces, one of said surfaces being exposed and the other of said surfaces being covered with a layer of discrete, transparent, spherical, particles of substantially the same size, said particles being from about ½ micron to about 10 microns in diameter, each of said particles in said layer being located directly against and is secured to the other of said surfaces, said particles within said layer being bonded to the other of said surfaces, the surfaces of said particles remote from said body being exposed so that light can be conveyed from said one of said surfaces through said body to the other of said surfaces and then to said particles.

2. An optical structure as claimed in claim 1 wherein all of said particles are transparent to visible illumination.

3. An optical structure as claimed in claim 1 wherein said particles are of different colors.

4. An optical structure as claimed in claim 1 wherein said particles are of the same color.

5. An optical structure as claimed in claim 1 wherein said particles are capable of fluorescing in response to illumination.

6. An optical structure as claimed in claim 1 wherein:
    said particles are from about 1 to about 4 microns in diameter,
    said particles are in contact with one another,
    said particles and said body are clear and transparent to visible illumination, and
    said body is a flat, planar body.

References Cited

UNITED STATES PATENTS

| | | | |
|---|---|---|---|
| 2,379,741 | 7/1945 | Palmquist | 250—71 X |
| 2,485,561 | 10/1949 | Burroughs | 250—71 X |

RALPH G. NILSON, Primary Examiner

D. L. WILLIS, Assistant Examiner

U.S. Cl. X.R.

250—77